United States Patent

[11] 3,607,195

| [72] | Inventor | Yasuo Horio |
| | | Yao-shi, Japan |
| [21] | Appl. No. | 825,914 |
| [22] | Filed | May 19, 1969 |
| [45] | Patented | Sept. 21, 1971 |
| [73] | Assignee | Yamabishi Industry Co., Ltd. |
| | | Yao-shi, Osaka, Japan |
| [32] | Priority | May 25, 1968 |
| [33] | | Japan |
| [31] | | 43/35653 |

[54] APPARATUS FOR FRACTURING HOT GOBS OF GLASS
4 Claims, 8 Drawing Figs.

[52] U.S. Cl. .................................................... 65/165,
     209/11, 209/173
[51] Int. Cl. ................................................... C03b 37/00
[50] Field of Search .......................................... 209/173,
     11; 65/165, 168

[56] References Cited
UNITED STATES PATENTS

| 945,692 | 1/1910 | Campbell | 209/173 |
| 1,048,767 | 12/1912 | Twedt | 209/173 |
| 3,357,559 | 12/1967 | Israelson | 209/218 |

Primary Examiner—Arthur D. Kellogg
Attorney—Wenderoth, Lind & Ponack

ABSTRACT: Apparatus for fracturing hot glass lumps or gobs by dropping them from the heating furnace supply into cold water being circulated in a conveyor through where the sudden temperature change fractures the lumps or cracks them ready for fracturing into small pieces; and improved bath and conveyor apparatus in which the initially unsuitable molten gobs or lumps of glass are fractured and collected for reprocessing for ultimate productive use.

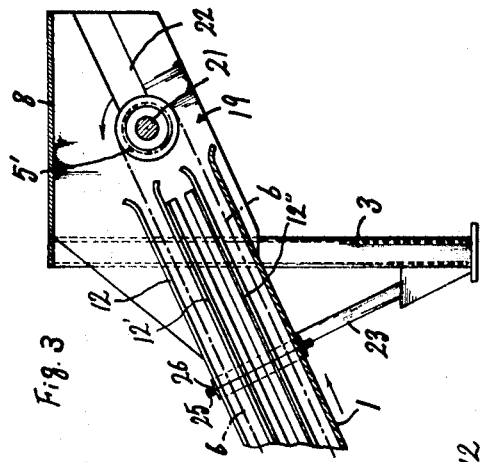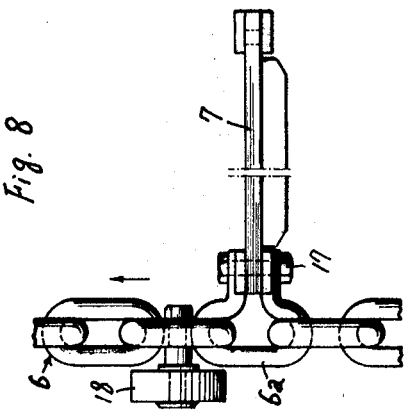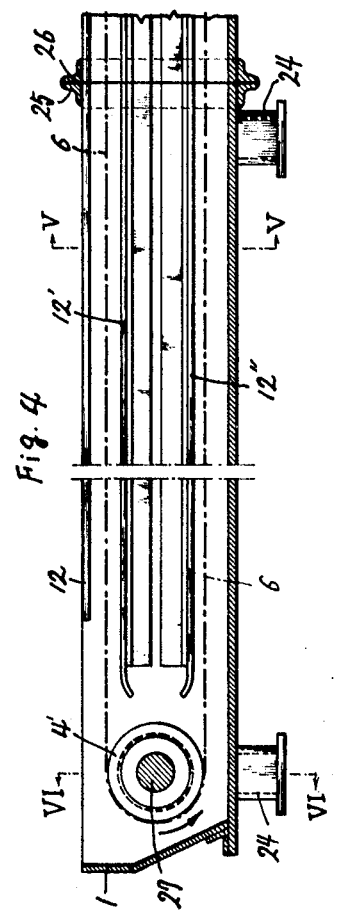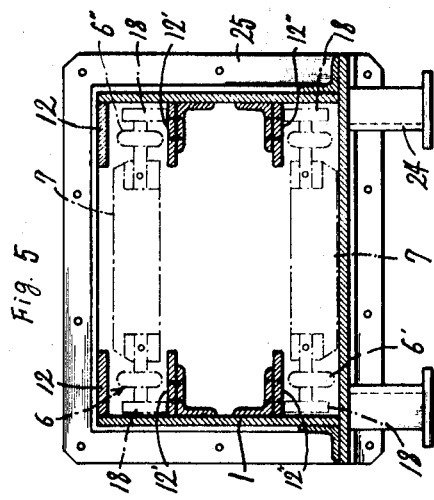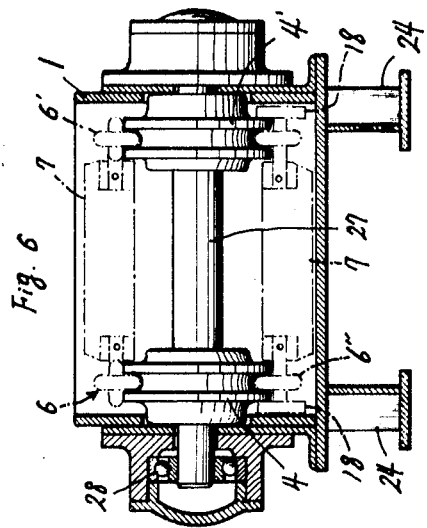

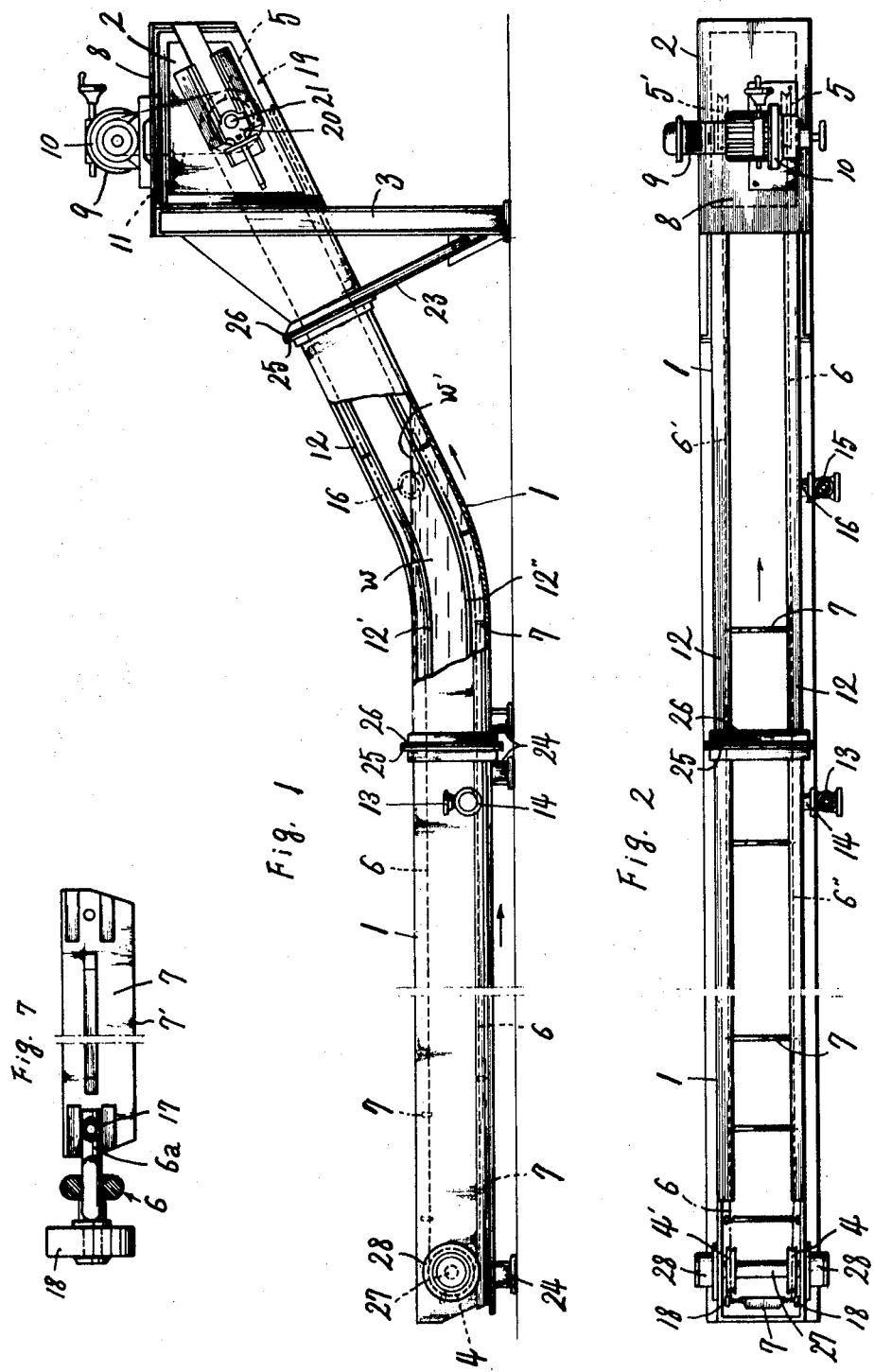

APPARATUS FOR FRACTURING HOT GOBS OF GLASS

The present invention relates to a scraper conveyor of a type adaptable to automatically feed solid pieces which are formed within the conveyor casing by process of fracturing molten glass gobs responsive to collecting the molten gobs of glass in a cold water bath and conveying means.

It is well known in the skilled art that a typical automatic bottle-fabricating machine can be arranged so that each molten glass gob, which is formed by squeezing molten glass in a melting furnace, is of a size and amount sufficient enough to fabricate one glass bottle; and the glass gobs are successively supplied by means of gob feeder to a bottle-blowing machine wherein the desired shape of a bottle is formed, and thereafter made up to the final desired bottle through suitable subsequent processes. However, since the automatic bottle-fabricating machine of the prior art type described above operates to effect the whole processes continuously once it is actuated, the glass gobs which are not in proper condition because of various reasons including, for example, due to the improper temperature of each molten glass gob, or other conditions of the bottle-blowing machine, cannot be supplied to the gob feeder. Accordingly, these gobs which are not in proper condition should be removed.

Heretofore, the removing operation of the glass gobs which could not be supplied to the gob feeder has been carried out by the attendant worker in a manner as to take out the glass gobs from the interior of a trough positioned adjacent to the gob feeder into which trough the glass gobs are thrown or discharged from the gob feeder, and to carry the glass gobs thus taken out to the predetermined place where the reproducing process is performed.

On the other hand, since the melting furnace is usually positioned around the bottle-blowing machine so that a higher temperature exists therearound, and since the working place or area around the melting furnace is so narrow that it is difficult to work therearound, an efficient operation cannot be readily performed by the attendant worker. In addition thereto, the attendant worker is susceptible to thermal hazards. Furthermore, water contained in the trough reaches the boiling point so rapidly that the molten glass gobs remain in their original forms without being fractured into pieces. As long as the molten glass gobs remain unfractured and cannot be subsequently furnished as reproducing raw material in view of the size and shape thereof, they must be smashed into fine pieces by hammering, resulting in the requirement of substantial extra labor and time thereby resulting in an unmeasurable loss in term of work efficiency.

The present invention has for its object not only to provide a device adaptable in the automatic bottle-fabricating machine but also a novel process of making and transporting molten glass gobs from the melting furnace to a bottle-blowing machine, whereby the rejected molten glass gobs which are not in proper condition are collected in the water-filled conveyor casing to stay at a safety zone remote from the furnace, and which performs as part of the process the taking out from the interior of the conveyor casing the fractured subsequently solid pieces of the molten glass gob formed therein by quenching in contact with circulating cold water within the casing.

The present invention will now be more fully described with reference to the accompanying drawings, in which:

FIG. 1 is a side view of the device, partially broken away, of the present invention, FIG. 2 is a plan view thereof, FIG. 3 is an enlarged longitudinal section showing a head portion of the conveyor casing according to the present invention, FIG 4 is an enlarged longitudinal section showing a tail portion of the conveyor casing according to the present invention, FIG. 5 is a vertical cross section taken along the line V—V in FIG. 4, FIG. 6 is a vertical cross section taken along the line VI—VI in FIG. 4, FIG. 7 is a partially enlarged elevation of a portion of a scraper chain incorporated in the device of the present invention, and with part of the chain shown in cross section; and FIG. 8 is a plan view of the scraper chain means shown in FIG. 7.

As can be clearly understood from the accompanying drawings in which one embodiment of the present invention is shown, the scraper conveyor for taking out the fractured glass pieces comprises a conveyor casing effective to accommodate chilling water therein, a scraper chain effective to scrape glass pieces to be taken out, a drive means therefor, and means for guiding said scraper chain.

Referring now to FIGS. 1 and 2, the reference numeral 1 is a conveyor casing of channel-shaped cross section constructed with two opposed sidewalls and one bottom wall interposed therebetween and with its ceiling portion open upwardly and which conveyor is horizontally positioned over a desired predetermined length. A front portion of said casing is upwardly extended from an intermediate portion thereof toward a head frame 2 so as to form a predetermined incline or grade (of about 20° to 30°). Said head frame 2 is arranged at a suitable height on supporter posts 3 so as to connect to the inclined upper portion of the conveyor casing 1. Provided respectively in the tail portion of said casing 1 and in said head frame 2 is a first pair of opposed chain wheels 4 and 4', and a second pair of opposed chain wheels 5 and 5', are around which two endless chains 6' and 6'' are respectively suspended. Said endless chains 6' and 6'' are driven to circulate in one direction at a desired speed, with the chain wheels 5 and 5' serving as driving wheels. Between said endless chains 6' and 6'', a plurality of scrapers 7 are fitted at fixed intervals to complete the overall scraper chain 6.

The driving wheels 5 and 5' are rotated by a drive motor 9 suitably mounted as on a ceiling board 8 of the head frame 2, through a final reduction gear 10, which in turn drives a power transmission chain 11, thereby causing each scraper 7 adjacent to the bottom wall or board of the conveyor casing 1 to move in the direction of the head frame 2.

On each inner surface of the opposed sidewalls of the conveyor casing 1 and head frame 2, guide rails 12, 12', and 12'' are provided in three stages to form generally parallel guides for guiding the scraper chain 6.

The conveyor casing is constructed in a manner as to prevent water in the casing from leaking, and contains chilling water W therein. The chilling water W fills the casing up to the upper edges of the opposed sideboards of the casing 1. For this reason, the inclined upper portion of the casing 1 and the head frame 2 are positioned above the level water W' and a portion of the scraper chain 6 positioned therein is out of the contact with the water W while the remaining portion of the scraper chain 6 is submerged in the water W together with the chain wheels 4 and 4' in the tail portion.

On one sidewall of the conveyor casing 1, an inlet mouthpiece 14 having a cock 13 through which chilling water is supplied and an outlet mouthpiece 16 having a cock 15 through which water is discharged are provided respectively adjacent to the bottom and at an elevated place parallel to the bottom level of water W' at a longitudinally spaced interval, so that water supplied through the inlet piece 14 can be naturally discharged through the inlet piece 16 by the 'overflow' phenomenon to maintain the temperature of the water in the casing 1 at a predetermined desired value since the water otherwise tends to become overly heated by heat exchange.

The scraper chain 6 is constructed as shown in FIGS. 7 and 8 so that the both edges of each scraper 7 are respectively clamped by split ring members 6a constituting parts of the chain, of which said ring members are in turn fastened by respective bolts 17 passing through the scraper. The chains 6' and 6'' each include a plurality of combined antifriction and guide rollers 18 spaced at suitable intervals, while each of the scrapers 7 is arranged to cross at right angle relative to the lengthwise direction of the casing 1, and the bottom edge 7' of each scraper is positioned for slidable contact with the bottom of the casing.

The bottom wall or floor of the head frame 2 is downwardly cut open at a portion beneath the chain wheel 5 to form an outlet opening 19 through which glass pieces are discharged.

Still referring to FIG. 1, the reference numeral 20 is a bearing unit slidably mounted in the head frame 2 so as to journal the both ends of a drive shaft 21 connected with the driving wheels 5 and 5'. Said bearing unit 20 is slidable in the forward and rearward directions along grooves 22 provided for the purpose of adjusting the tension of the scraper chain 6.

The reference numeral 23 denotes supporter struts, 24 denotes supporter legs, 25 and 26 represent flange joints, 27 denotes a shaft connected with the chain wheels 4 and 4' at the tail portion, and 28 denotes a bearing unit for said shaft 27.

In the arrangement heretofore described, when the motor 9 is driven to rotate the driving wheel 5 and 5' in the counter-clockwise direction, the scraper chain 6 suspended between the rear and front chain wheels 4 and 5 moves in the forward direction (as shown by the arrow mark in FIGS. 1 and 2) at one side adjacent to the bottom of the casing 1 with the scrapers 7 of which each bottom edge slides in contact with the bottom thereof in the same direction.

On the other hand, prior to the operation of the device of the present invention, as part of the process chilling water must be continuously introduced into the conveyor casing 1 at a suitable flow rate through the inlet mouthpiece 14 after the respective cocks 13 and 15 for both mouthpieces 14 and 16 are respectively fully released. When the casing 1 is completely filled with water, excessive water overflows from the outlet mouthpiece 16 so that a supply of fresh chilling water is maintained within the conveyor casing.

In this condition, certain of the molten glass gobs are successively dropped down to the tail portion into the casing 1, where the glass gobs are quenched to break into fine solid pieces of glass as a result of rapid change of the temperature, and then are gravitationally deposited on the bottom of the tail portion of the casing 1. As soon as the fine solid pieces of glass become deposited on the bottom in the water, they are successively scraped in the arrow-indicated direction by a plurality of the scrapers 7 circulating together with said scraper chain 6.

During the operation of the scraper chain and scrapers 7, the scraped glass pieces are further chilled as they move through the water in the direction of the head frame 2. When they arrive at the inclined portion having outlet spout 16, water accompanying the glass pieces becomes drained off. In this condition, the glass pieces are moved up the inclined spout, up within the head frame 2 while being pushed along by the scrapers 7, and then are discharged from the outlet opening 19 provided on the head frame 2, and thereafter collected at a predetermined place from which the collected glass pieces are transported to a desired place.

Because the solid glass pieces discharged from the outlet opening 19 on the head frame 2 are so fine, they can be used as raw material or mixing material in the further process of reproducing glass bottles.

The present invention is thus constrained as heretofore described, wherein the scraper chain adapted to be operated by the motor at a constant speed is mounted in the water-filled conveyor casing of predetermined length so as to cause each scraper connected to said scraper chain to slide in contact with the bottom of the water-filled conveyor casing. Therefore, if the device of the present invention is, for example, arranged close to the melting furnace and included in the automatic bottle-fabricating machine to receive into the tail portion of the conveyor casing certain of the molten glass gobs fed from the gob feeder through a chute, the glass gobs are readily quenched to break into fine solid pieces as they drop from the gob feeder, and are in turn continuously scraped by the scraper out of the head frame through the outlet opening. Accordingly, the operation of removing those molten glass gobs which cannot be suitably supplied to the gob feeder as hereinbefore described can be readily and efficiently performed.

Furthermore, the tail portion of the conveyor casing according to the present invention can be interposed efficiently between the melting furnace and the bottle-blowing machine so as not to occupy a large area, and also so that the outlet opening on the head frame is located remote from the both bottle-blowing machine and melting furnace whereby the thermal hazards may not adversely effect the operation and the operation can be safely performed.

The present apparatus invention is thus constructed as heretofore described to conduct the improved process wherein the mouthpiece for water supply and the mouthpiece for water discharge are fitted on a sidewall of the conveyor casing respectively adjacent to the bottom thereof and at a spaced-apart place parallel to the level water so that the water supplied through the mouthpiece for water supply can naturally overflow through the mouthpiece for water discharge as the water becomes heated by heat exchange, resulting in the constant maintenance of fresh chilling water in the casing throughout the operation thereof. And also, while the fractured glass pieces are successively scraped and moved by a plurality of scrapers within the inclined spout, water contained in with the fractured glass pieces leaving from the contact with the water can be in turn drained off, and the glass pieces thereafter taken out from the outlet opening on the head frame. Accordingly, uniformly fractured pieces of the molten glass gobs can be furnished by this process as reproducing material of high quality.

The present invention has been hereinbefore fully described by way of example with reference to the accompanying drawings. It should be noted that the present method and apparatus can be modified in any way by those skilled in the art without departing from the spirit and scope of the present invention.

Claim for the patent:

1. For use with glass article making apparatus utilized in conjunction with a glass-melting furnace wherein certain of the molten gobs or lumps of glass as used therein are initially rejected, an improved scraper conveyor for receiving and processing said rejected molten glass gobs, comprising in combination:
   a. an elongated conveyor casing of generally channel-shaped cross section which is upwardly open and sequentially includes:
      1. an elongated generally horizontal first section closed at one end into which said glass gobs and introduced, and open at the other end;
      2. an intermediate section having both a generally horizontal and upwardly inclined portion, and connected to said first section via the horizontal portion; and
      3. an inclined head section extending as a continuation of said intermediate section via the inclined portion thereof; with means for connectively supporting said sections;
   b. inlet and outlet spout means formed in the horizontal and intermediate sections respectively of the casing and constituting part of means for circulating chilling liquid through said conveyor casing, whereby the molten glass gobs are quenched and transformed into fine pieces both by the initial quenching and subsequent conveying action thereof;
   c. scraper chain means including a plurality of scrapers for transporting the glass pieces, and disposed transversely to the longitudinal length of the conveyor casing and connected at predetermined intervals between laterally spaced feed and return runs of a pair of conveyor chains, said scrapers disposed to operatively engage the bottom of the conveyor casing during drive feeding in a direction toward said head section;
   d. said head section disposed at a suitable height so as to be above the level of the liquid circulating in said casing, and having a discharge opening to and through which said glass pieces are scrapingly moved and discharged;

e. chain drive means including a drive motor mounted on said head section of said conveyor casing and driveably connected with said scraper chain means; and f. chain guide means including generally parallel vertically spaced guide rail plates provided on the infacing surfaces of both sidewalls of the conveyor casing in cooperatively opposed manner within which said chains are guided.

2. The improved conveyor as defined in claim 1 wherein said inlet and outlet spout means of paragraph (b) are provided on a sidewall of said casing and have selectively operable and closable cocks for regulating the circulating flow of liquid in said casing; said inlet spout means disposed adjacent the casing bottom, and said outlet spout means disposed in the inclined portion at the liquid level substantially on a line with the top of said first casing section so that said chain means is operatively disposed beneath the liquid level in said first conveyor section and at least partially in said intermediate conveyor section.

3. The improved conveyor as defined in claim 1 wherein said scraper chain means of paragraph (c) comprises two endless chains each having a plurality of combined guide and antifriction rollers at outwardly opposite sides and at predetermined spaced intervals for at least partial cooperative engagement with said guide rails; a pair of idler chain wheels journaled in and near the closed end of said first conveyor section around which said chains are operatively suspended; and a pair of driving chain wheels journaled in the head section of said conveyor casing around which said chains are also drivingly suspended; said drive wheels being operatively connected with said drive motor of paragraph (e).

4. The improved conveyor as defined in claim 3 wherein the conveyor chains include certain connecting links which not only interconnect with other chain links, but also include laterally extended flanges for attachment thereto of the transverse scrapers at the predetermined intervals.